United States Patent [19]

Hilhorst

[11] Patent Number: 4,872,147
[45] Date of Patent: Oct. 3, 1989

[54] SYSTEM FOR THE CONTROL OF A MEMBER FOR FOLLOWING A MOVING OBJECT, AN AUTOMATIC MILKING APPARATUS AND A METHOD FOR AUTOMATIC MILKING

[75] Inventor: Maximus A. Hilhorst, Werkhoven, Netherlands

[73] Assignee: Multinorm B.V., Netherlands

[21] Appl. No.: 944,855

[22] Filed: Dec. 22, 1986

[30] Foreign Application Priority Data

Dec. 27, 1985 [NL] Netherlands ............... 8503580

[51] Int. Cl.$^4$ ............................................. G01S 9/66
[52] U.S. Cl. ...................................... 367/96; 119/14.14
[58] Field of Search ........................ 367/95–98, 367/55; 119/14.14; 364/516; 901/13

[56] References Cited

U.S. PATENT DOCUMENTS

| | | | |
|---|---|---|---|
| 2,364,209 | 12/1944 | Green | 367/55 |
| 3,020,970 | 2/1962 | Hasbrook | 367/55 |
| 3,442,347 | 5/1969 | Hodgson et al. | 367/96 X |
| 3,559,157 | 1/1971 | Cupp et al. | 367/96 |
| 4,010,714 | 3/1977 | Notsuki et al. | 119/14.03 |
| 4,234,937 | 11/1980 | Eggleton et al. | 367/97 X |
| 4,635,241 | 1/1987 | Saglio | 367/95 |
| 4,715,019 | 12/1987 | Medlin et al. | 367/135 X |
| 4,726,322 | 2/1988 | Torsius | 119/14.14 |
| 4,748,936 | 6/1958 | Hogen | 119/14.14 X |

FOREIGN PATENT DOCUMENTS

| | | | |
|---|---|---|---|
| 0188303 | 7/1986 | European Pat. Off. | 119/14.14 |
| 0194729 | 9/1986 | European Pat. Off. | 119/14.14 |
| 0229682 | 7/1987 | European Pat. Off. | 119/14.14 |

Primary Examiner—Thomas H. Tarcza
Assistant Examiner—Tod Swann
Attorney, Agent, or Firm—John P. Snyder

[57] ABSTRACT

A system for the control of a member for following a moving object, especially a small object being part of larger entity, comprising an ultrasonic transmitter and receiver is characterized in that each sensor unit is fixed to the means of movement of a follower member. The ultrasonic sensor units are inexpensive and relatively insensitive to the dirt prevalent in an industrial or an agricultural environment. Since the sensor units can be brought relatively close to the object to be followed, the influence of the distracting larger entity is reduced and an accurate control system is obtained using simple reflection-sensing of the object. The control system can be applied in a milking apparatus. Furthermore the invention provides a method for the automatic milking of an animal.

15 Claims, 7 Drawing Sheets

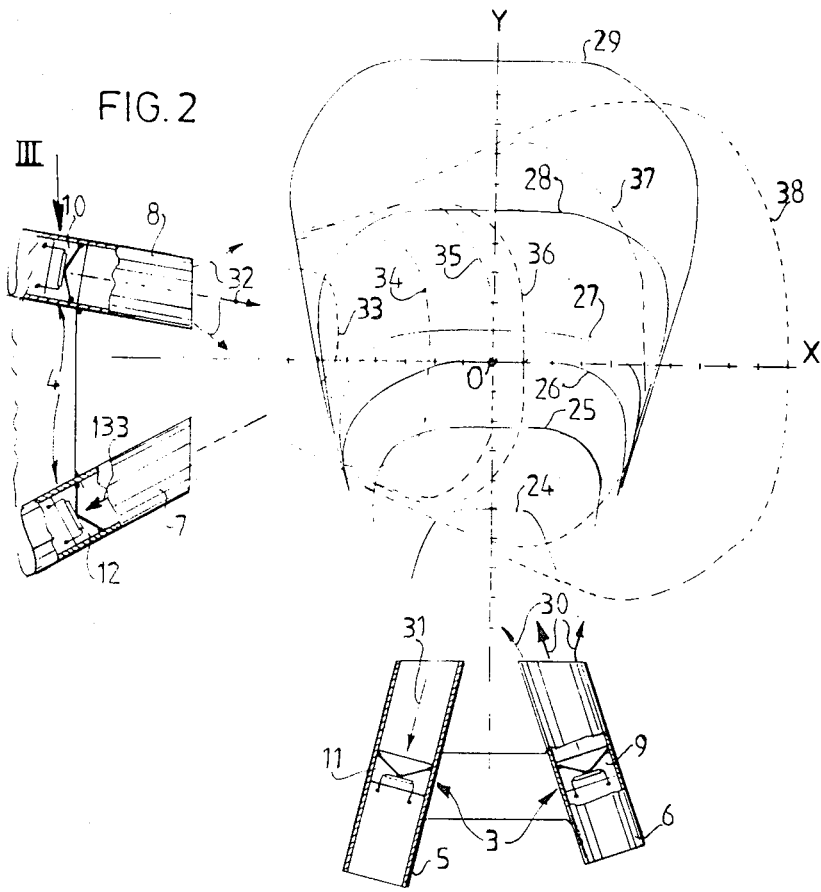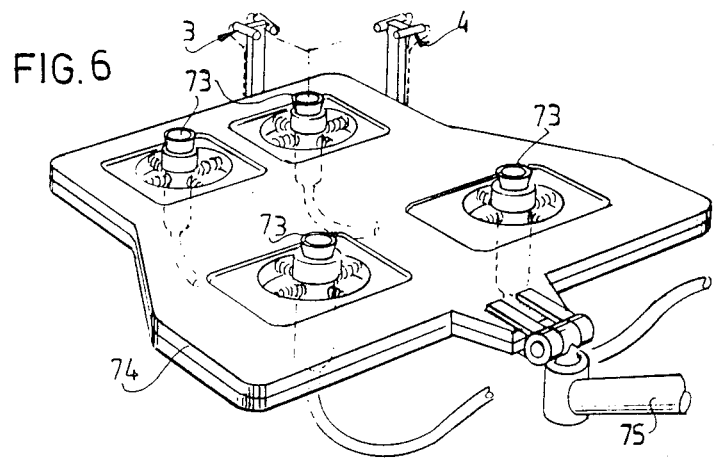

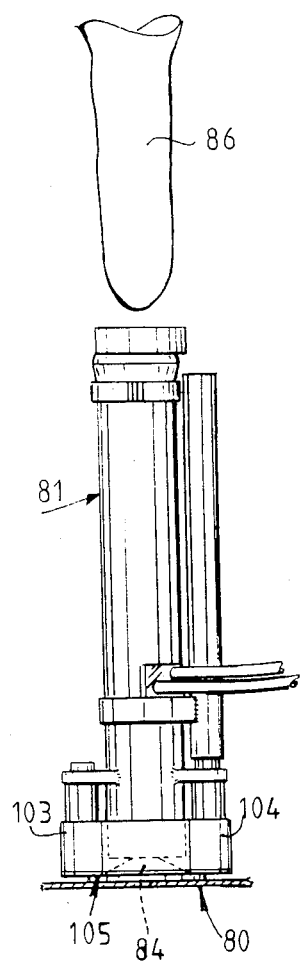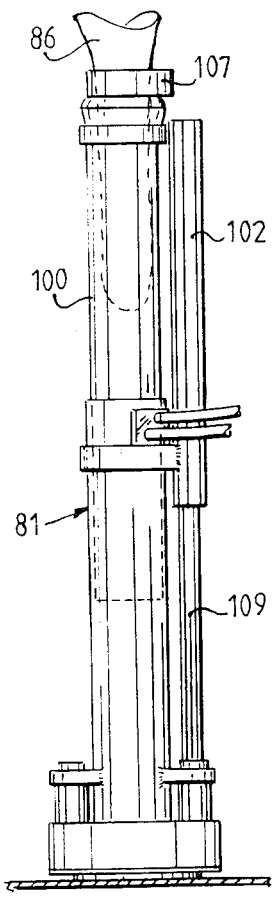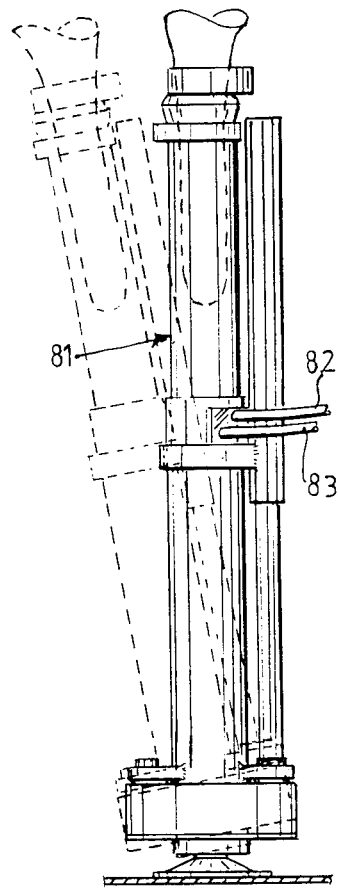
FIG.10 A  FIG.10 B  FIG.10 C

SYSTEM FOR THE CONTROL OF A MEMBER FOR FOLLOWING A MOVING OBJECT, AN AUTOMATIC MILKING APPARATUS AND A METHOD FOR AUTOMATIC MILKING

A control system of the kind is known from EP-A-No. O 106 719. From this, a position sensing system for the determination of a position in a nuclear reactor is known.

A disadvantage of this known control system is that it is not possible to follow a relatively small object accurately in a large space, said small object being part of a larger entity which can have a disturbing effect during sensing, as is the case, for example, with the teat of a cow.

This invention has for its aim to provide a control system wherein it is possible to follow the movements of a small moving object accurately.

The ultrasonic sensor units are inexpensive and relatively insensitive to the dirt prevalent in an industrial or an agricultural environment. Since the sensor units are coupled securely to the means of movement, the system of coordinates defined by the sensor units in which the moving object is situated moves as well as the object and, as far as possible, in correspondence to those movements. Since the sensor units can be brought relatively close to the object to be followed, the influence of the distracting larger entity is reduced, and an accurate control system is obtained using simple reflection-sensing of the object. Through this, a fine control system, to be coupled to a coarse control system, can be formed.

Through this control system the follower device can approach the object in directions other than those along which parts of the frame are arranged, for example along a surface of the larger entity whereof the object is part.

The control system is capable of following movements at a moving object frequency of up to 100 Hz with an accuracy of 1 mm, in the central area of an operational zone of roughly 100×100 mm, at a distance of 50 mm from each sensor unit.

The control system according to the invention can moreover be applied in a milking apparatus for milking a cow, as described for example in the present applicants' Dutch patent application No. 85.02434. In that patent application, movements of a cow's teat occur, in practice, at a frequency of up to a maximum of 50 Hz.

Furthermore, the invention provides a method for the automatic milking of a cow, wherein an automatic milking apparatus is applied.

Further advantages, features and details of the invention will be described in relation to a preferred embodiment, with reference to a drawing in which:

FIG. 2 is a diagram to explain the operation of the control system of FIG. 1.

FIG. 6 shows a second embodiment of the control system according to the invention, applied in a milking rack;

FIGS. 10A–10C show three phases in the fitting of a teat cup of FIG. 7; and

Figure 1:
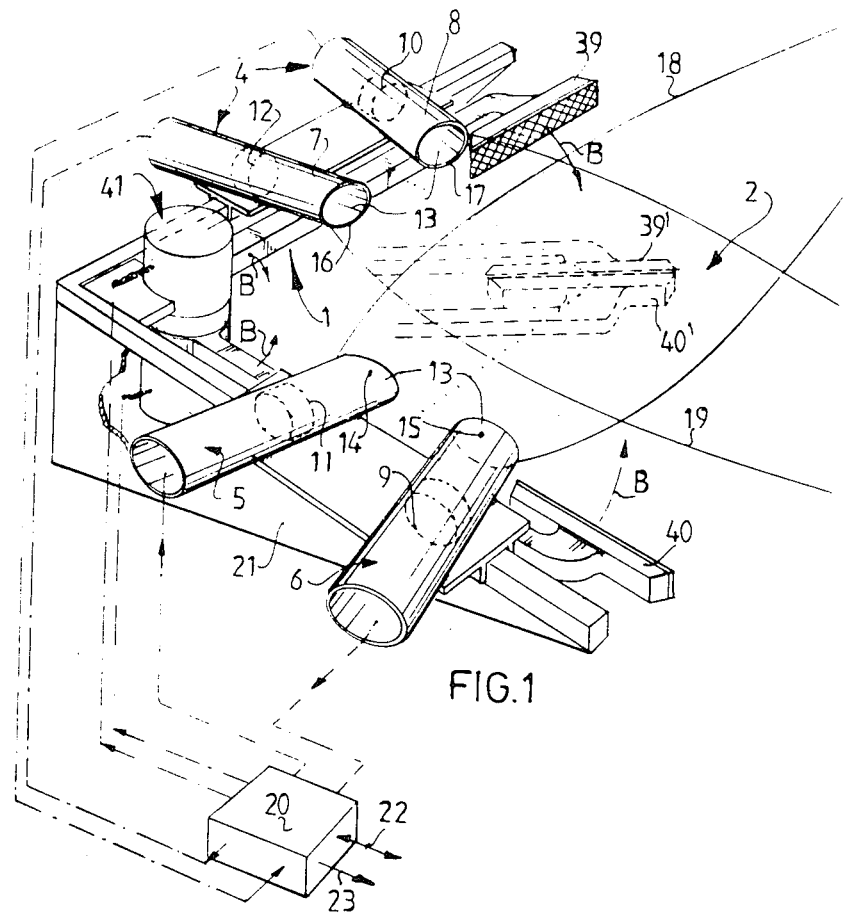
FIG. 1 shows a perspective, partly schematic view of a first embodiment of the control system according to the invention.

In a preferred embodiment of a system for controlling a member 1 for following a moving object in accordance with the invention, the position of an object in a measuring space formed by sensing zone 2 is measured by two sensor units, 3 and 4 respectively, arranged fixedly with respect to each other. Each sensor unit 3, 4 consists of an ultrasonic transmitter, 9 and 10 respectively, and an ultrasonic receiver, 11 and 12 respectively, each transmitter and receiver being mounted in a wave guide 5, 6, 7 and 8 respectively, said transmitters 9, 10 and receivers 11, 12, being mounted for reasons of shielding at some distance from openings 13 for the ultrasonic waves and said wave guides 5, 6, 7 and 8 having bevelled ends 14, 15, 16 and 17 respectively for further improvement of that shielding. Owing to bevelled ends 14, 15, 16 and 17, and owing to the relative disposition of wave guides 5 and 6 with respect to wave guides 7 and 8 at an acute angle, the respective empirically found lobes 18 and 19 are formed, within which a moving object is just detectable by sensor units 3 and 4 respectively.

Sensor units 3 and 4 are secured at right angles to frame 21, which is fixed to follower member 1 and thus similarly fixed to the movement means.

The position sensing system is further provided with a conversion means 20 coupled to transmitters 9, 10 and to receivers 11, 12, said conversion means comprising counting means for the measurement of the interval of time which elapses between the emission of a wave by a transmitter and the reception of the reflected wave by the associated receiver, and a means for determining the position of the object reflecting the vibration from that interval. Conversion means 20 may comprise a microprocessor coupled to a memory containing a program. Conversion means 20 are further joined by connections 22 and 23 to means (not shown) for moving the follower member. Movement means of the kind consist, for instance, of an arm coupled to a robot, and are generally known (see for example Dutch patent application 85.02434 and its corresponding U.S. Pat. No. 4,726,322).

The manner of operation of the position sensing system will be elucidated with reference to FIG. 2, in which the continuous curved lines 24, 25, 26, 27, 28 and 29 depict contours of equal propagation time of waves emitted by ultrasonic transmitter 9 as indicated by arrows 30, to be reflected from the object and received by receiver 10 as indicated by arrow 31. Conversion means 20 send a pulse to transmitter 9 by means of a transmitter circuit to be described later and then measure, with aid of the counting means, the time interval which has elapsed between the emission of a vibration by the transmitter and the reception of the reflected vibration, which is conveyed to the counting means via an envelope detector to be described herebelow. By this means it is determined on which of lines 24-29 the moving object is situated. Immediately thereafter, a pulse is conveyed by the conversion means via a similar transmitter circuit to transmitter 10, which transmits ultrasonic waves to the moving object, in a similar way, via arrows 32 and 133, whereafter receiver 12, the envelope detector and the counting means determine, in a similar way, on which of the broken lines 33, 34, 35, 36, 37 or 38 the moving object is situated. Thus it is known to conversion means 20 on which intersection of a continuous line and a broken line the moving object is situated, and if this detected position differs from a previously defined value stored in the conversion means, for example point O of a coordinate system XY depicted in figure 2, conversion means 20 immediately regulate the movement means in order to so change the position of the follower member and thus of sensor units 3, 4 that the moving object is once again situated at point O of the mobile coordinate system XY.

If the moving object is situated in the predetermined position for a previously specified period of time recorded in conversion means 20, follower member 1 can grasp the moving object. In FIG. 1 the follower member consists, for example, of two fingers 39, 40 which can be operated by conversion means 20 through agency of an electric motor 41. On actuation by conversion means 20, fingers 39, 40 move in the direction of arrows B until they grip the moving object (see the position of the fingers drawn in broken lines).

Figure 3:
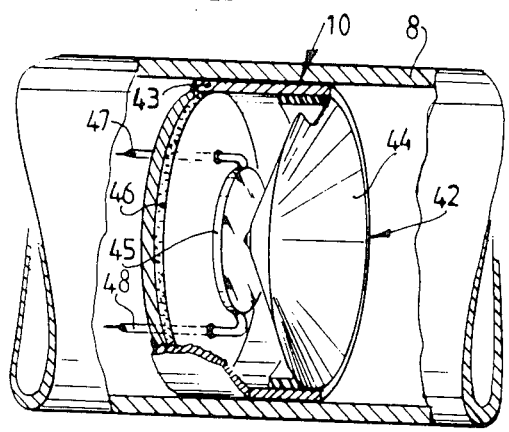
FIG. 3 shows a perspective view of detail III of FIG. 2.

Preferentially, each transmitter and each receiver comprises a relatively simple per se known transducer 42, shown in FIG. 3, which comprises a housing 43, fastened thereto a (for example) alumininium cone 44, a piezo-ceramic element 45 to convert ultrasonic waves conveyed by the cone into electrical signals, a damping plate 46 and leads 47 and 48 joined severally to piezoceramic element 45.

Figure 4:
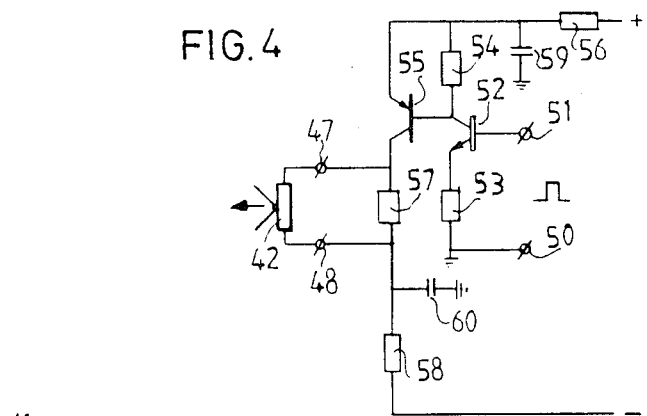
FIG. 4 is a diagram of a transmitter circuit for driving the transmitters of FIG. 1.

If leads 47 and 48 are connected (FIG. 4) to a transmitter circuit 49 it is possible to use transducer 42 as a transmitter, making use of a pulse originating from the conversion means which is applied across terminals 50, 51 of transmitter circuit 49. On application of a pulse across terminals 50, 51, a transistor 52 is made conductive with the aid of resistor 53, whereby transistor 55 is made conductive with the aid of resistor 54, so that the full supply voltage, for example 24 V, is applied via three resistors 56, 57 and 58 across terminals 47 and 48. The transmitter circuit is further provided with earthed decoupling capacitors 59 and 60 next to resistors 56 and 58 respectively.

The spectrum of the ultrasonic wave pattern issued by transducer 42 is determined both by the electrical properties and the mechanical properties of the transducer. When it is driven with the aid of a pulse originating from the conversion means, a waveform arises which comprises predominantly, but not exclusively, waves at the transducer's electrical resonant frequency of approximately 40 kHz, while moreover an amplitude results which increases and decreases only slowly, in comparison to the steep rising and falling edges of the pulse, on account of the mechanical properties of the transducer, so that a kind of envelope of the 40 kHz waves is formed.

Figure 5:
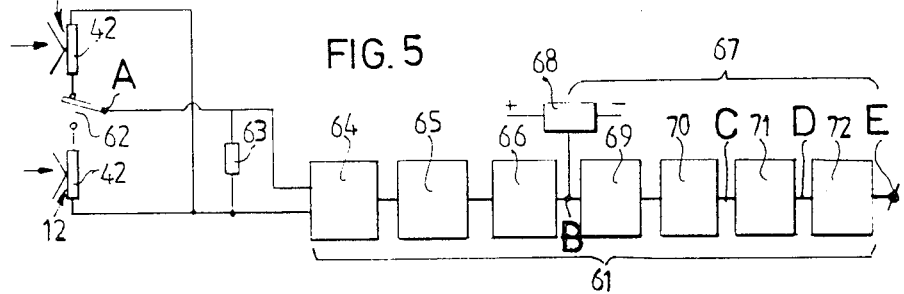
FIG. 5 shows a block diagram of an envelope detector coupled to the receivers of FIG. 1.
Figure 5A:
FIGS. 5A - 5E show the waveforms arising at points A, B, C, D and E respectively in the block diagram of figure 5.
Figure 5B:
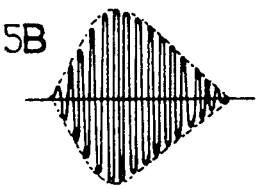
Figure 5C:
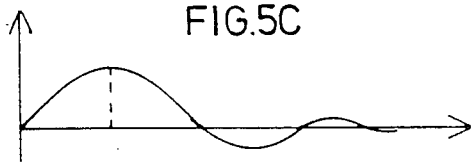
Figure 5D:
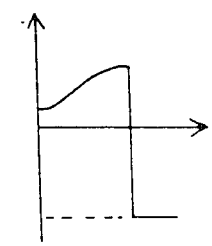
Figure 5E:
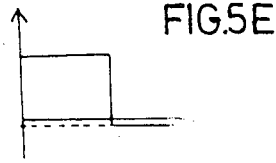

In FIG. 5 an envelope detector 61 is shown, to be coupled to the conversion means at E, which detector can be switched by the conversion means with the aid of a schematically depicted electronic switch 62 between the transducers 42 of receivers 11 and 12 respectively. The above-described emitted, reflected and thereby attenuated wave pattern is passed via A (FIG. 5A) over a resistor 63 to an amplifier 64. The detected signal is fed, via high quality factor (Q-factor) band-pass filters 65 and 66 which only allow passage of waves at the electrical resonant of approximately 40 kHz, at point B to peak detector 67. The use of LC filters is preferred, to improve the noise level of the signal and to increase the Q-factor and improve the stability of the filters. The DC voltage level at B can be accurately adjusted with the aid of adjustment circuit 68. After rectification with the aid of rectifier 69 and low-pass filtering with the aid of low-pass filter 70 there results at C the waveform shown in FIG. 5C which is approximately the envelope of the signal shown in FIG. 5B. The moment at which the signal has reached its maximum value is determined with the aid of a peak detector 71, and there results the signal shown in FIG. 5D, which is converted by an A/D unit 72 into a digital form suitable for the conversion means. It emerges, surprisingly, that by making use of envelope detector 61 it is possible to measure the elapsed time interval between emission and reception with a narrower accuracy than the oscillatory period of the 40 kHz waves. (Compare the above-described accuracy to the wave-length of 40 kHz waves in air of about 8 mm.) In fact, the envelope detection makes use of the above-described mechanical properties of the transducer.

The control system according to the invention can be applied with advantage in an automatic milking apparatus (FIG. 6) for a cow, in which the object to be followed is a cow's teat and in which the follower device is milking rack 74, provided with four teat cups 73, which is arranged for the four teats of a cow. Above one of the teat cups 73, there are mounted sensor units 3, 4, which are connected in a way not shown to the movement means of an arm 75 of a milking apparatus, not shown. Sensor units 3, 4 need only be mounted around one of the teat cups 73, since after automatic recognition of a cow by the automatic milking apparatus the other three teat cups 73 have already been arranged in a mutual pattern characteristic for the specific cow (see NL-A-85.02434). Obviously, the follower device may equally comprise only one teat cup.

A third embodiment of the control system according to the invention (FIG. 7) is mounted on a milking rack 80 that is provided with four teat cups 81, on which there are arranged conduits 82 and 83, for the carrying off of milk and for the application of a vacuum in the teat cups, respectively. Teat cups 81 are held on the milking rack by means of a biaxial hinge 84, so that they can pivot with respect to milking rack 80 within limits determined by limiting bars 85. Teat cups 81 can be moved upwards, as will be further described herebelow, to a position around teats 86 of an udder 87. Milking rack 80 is gripped by movement means in the form of an arm 88 of a robot 89. Preferentially, arm 88 is connected detachably to the milking rack, so that robot 89, which is movable on account of guide rails 90 and 91 and transmission 92, can also be deployed for other milking racks. The cow comes to stand on a grid 93, beneath which a trough 94 for the discharge of dung is arranged.

Further details of the automatic milking apparatus shown here are described in Dutch patent application 86.02942, of which the contents should be further regarded as interpolated here. Fastened to milking rack 80 there is a standard 95 (FIGS. 7, 8), to which curved holders 96 are fastened approximately at a right angle by means of arms 97, and in which piezo-electric films 98 are stuck securely. Films 98 form a combined transmitter/receiver for ultrasonic waves and are coupled to the controlling means of robot arm 88 via leads 99 in a manner not further shown, such that for instance the right fore teat of the cow is continually followed by robot arm 88 and hence by milking rack 80. Obviously, standard 95 can also be fixed to arm 88, so that this sensor unit 95–99 can be deployed by other milking racks (not shown).

Figure 7:
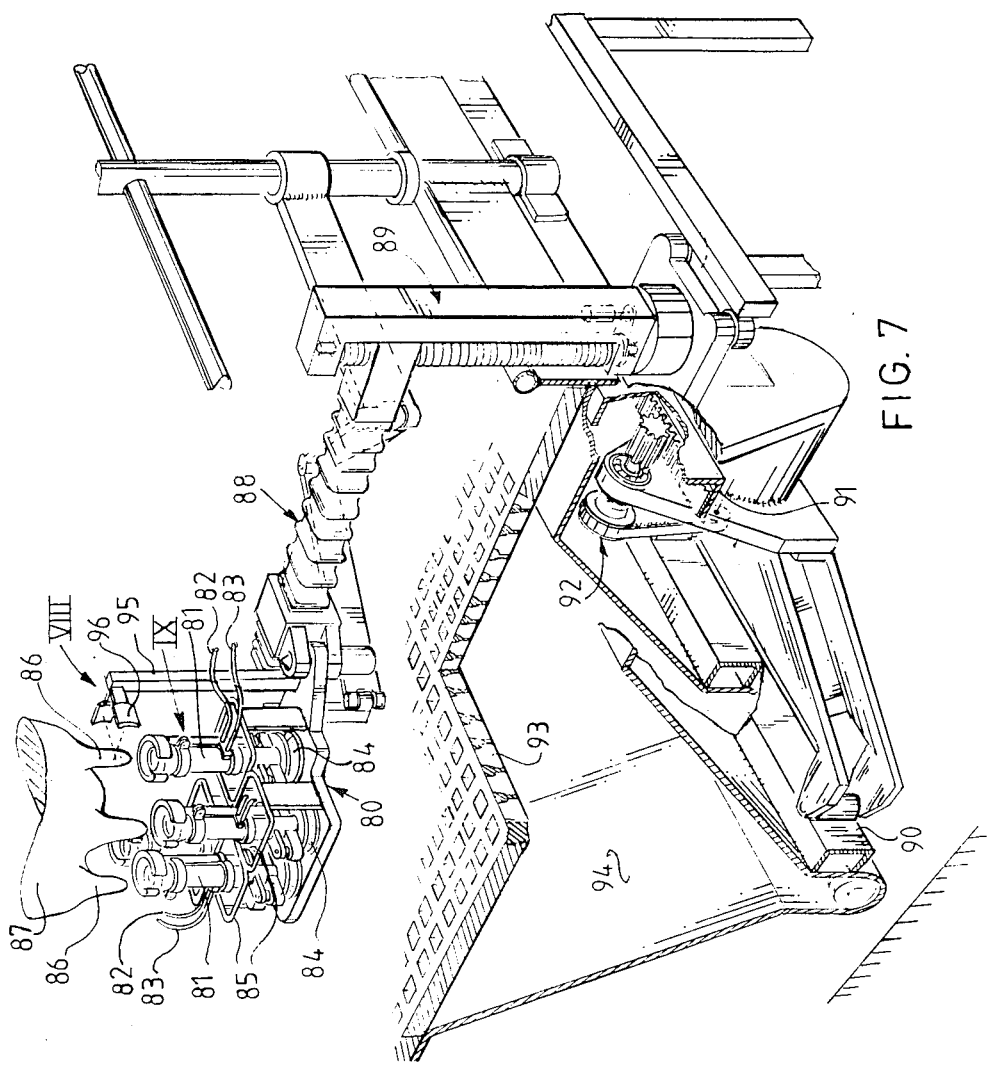
FIG. 7 shows a perspective view of a third embodiment of the control system according to the invention, applied in a milking rack.

After the automatic recognition of a cow positioned on grid 93, the position of that cow's udder is globally known, as described in Dutch patent application 85.02434, and milking rack 80 is moved towards udder 87 by action of the controller, not shown, of robot 89 through arm 88, until, for instance, the right fore teat of the cow is situated in the sensing zone of 95–99, as indicated by broken lines in FIG. 7. Since piezo-electric films 98, each of which functions as ultrasonic transmitter as well as ultrasonic receiver, are curved, there results a focussing of the ultrasonic waves and hence a precise delimitation of the sensing region, particularly in the vertical direction, so that a flat sensing zone is obtained, such that in FIG. 7 a practically constant distance of teat cups 81 with respect to teats 86 results. The sensing zone occupies an area of, for instance, 10×8×2 cm.

A teat cup 81 (FIG. 9) is coupled to an only partly shown milking rack through a biaxial hinge 84. Upper portion 100 of the teat cup is slidable inside lower portion 102 thereof, so that upper part 100 can be raised by action of a piston slidable in a cylinder 102. In cylinders 103, 104 there are arranged pistons which push the entire housing 105 in which cylinders 103, 104 are mounted down against milking rack 80 so that the hinging operation of hinge 84 is blocked. The slidable pistons in cylinders 102, 103, 104 are driven hydraulically or pneumatically in a manner not further shown.

Above and at least partly surrounding opening 106 of teat cup 81, there is mounted a sensor ring 107 which is provided with at least three sensor elements 108 arranged symmetrically around the opening, which elements preferentially consist of ultrasonic transmitter-receiver combinations. The sensor elements can, however, consists of light-detecting and light-emitting elements, as described in Dutch patent application 85.02434, mounted on ring 107.

Sensor elements 108 jointly form a fine sensor, which is connected to the controlling means for arm 88 of robot 89, so that, during the raising of the upper portion 100, as soon as sensor elements 108 detect the teat within ring 107, this fine sensor takes over the control of robot arm 88 and ensures that ring 107 holds teat 86 of a cow exactly in its centre.

Figure 9:
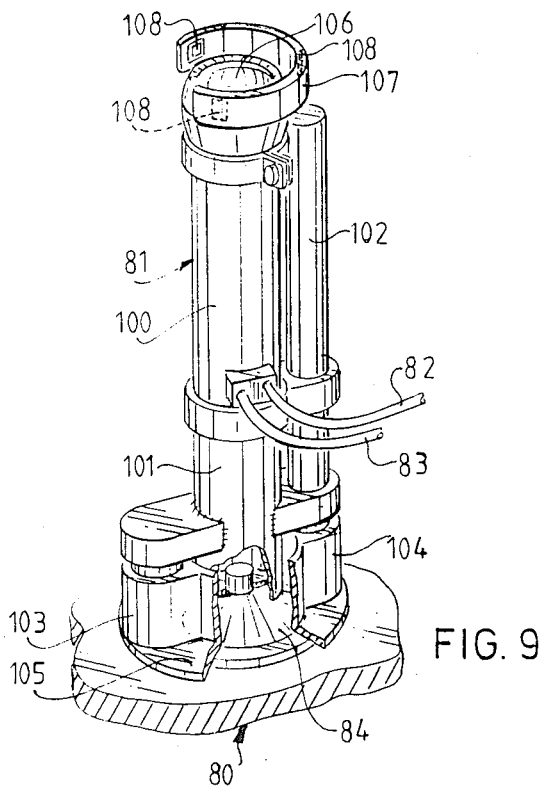
FIG. 9 shows detail IX of FIG. 7 in a perspective view on an enlarged scale.
Figure 8:
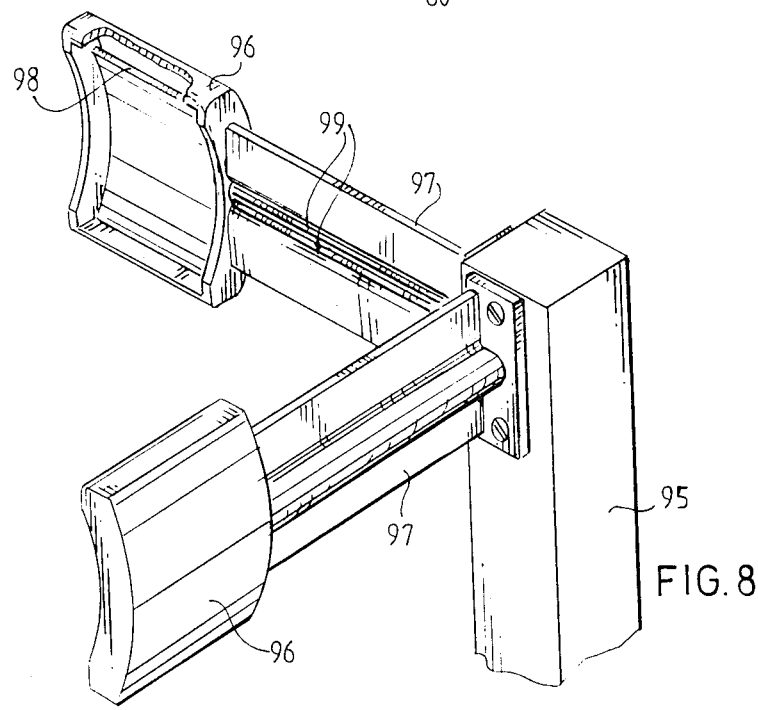
FIG. 8 shows detail VIII of FIG. 7 on an enlarged scale.

In a method (FIGS. 10A–10C) employing an automatic milking apparatus according to FIGS. 7–9, sensor unit 95–98 adopts a position with respect to the right fore teat of a cow such that a teat cup 81 is located directly under teat 86, for example the left rear teat thereof. The relative positions of the teats of a particular cow are stored in the memory of the control system of robot 89, and adjusted in the light of new data at each milking. The size of the udder and hence the relative teat positions change with time, for example depending on the time since the previous milking. In this way sensor unit 95–98 can take, through agency of the controller of robot 89, the correct position each time with respect to the right fore teat of the cow. When teat 86 is situated directly above teat cup 81, housing 105 becomes locked onto milking rack 80 by means of the pistons sliding in cylinders 103, 104, so that hinge 84 is immobilized. Then, through the agency of a piston 109 (FIG. 10B) which slides in a cylinder 102, said cylinder 102 and thereby the upper portion 100 of teat cup 81 is raised by hydraulic or pneumatic pressure to a position around teat 86. Hereby, the control of milking rack 80 is taken over by the fine sensor mounted in ring 107, immediately after sensor elements 108 have ascertained the presence of teat 86.

As soon as upper portion 100 of teat cup 81 is arranged entirely around the teat, milking can take place by agency of conduits 82 and 83 (FIG. 10C), and after housing 105 has been raised with respect to the milking rack teat cup 81 can follow the motions of teat 86, as indicated by broken lines in FIG. 10C.

Figure 11:
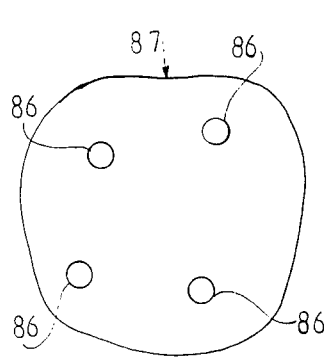
FIGS. 11A–11C are a schematic representation of the method for applying the four teat cups.
Figure 11:
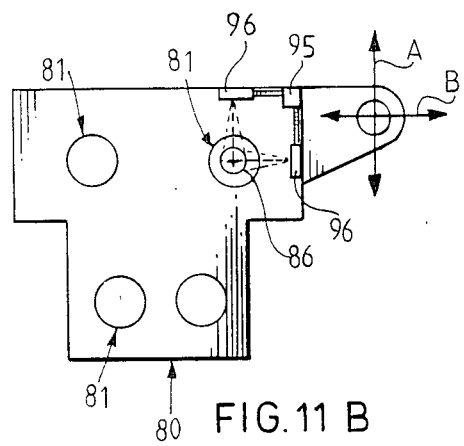
Figure 11:
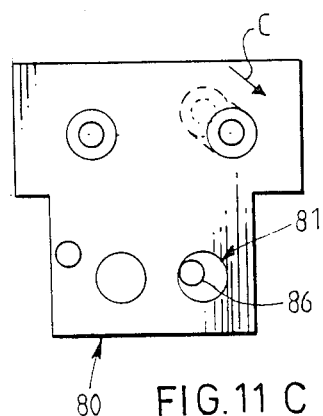

With the automatic milking apparatus according to FIGS. 7–9 and the method according to FIGS. 10A–10C, it is possible to locate one-by-one the teats of a cow, in an arbitrary mutual disposition (FIG. 11A), with the aid of milking rack 80 upon which sensor unit 95–98 (FIG. 11B) is mounted. Teat cups 81 (FIG. 11B) can be moved in the direction of arrows A and B with the aid of the robot arm, so that teat 86 can be kept directly above a teat cup 81 by steering the robot arm through sensor units 95–98. After the actions illustrated in FIGS. 10A–10C the teat cup has been brought around teat 86, and a next teat cup 81 can be positioned under a teat 86 (FIG. 11C), while the first fitted teat cup can move in the direction of arrow C, since said first fitted teat cup is hingeably joined to milking rack 80. In this way, the teat cups can be fitted one by one, the mutual positions of the teats being after all known from the memory of the control system, and sensor unit 95 - 98 can therefore always adopt the correct position with respect to right fore teat 86.

It should be remarked that the sensing space can also be formed by three mutually perpendicular sensor units, it being once again possible to bring the follower member towards the object along directions not blocked by a frame.

Finally, it should be remarked that, both in two and in three dimensions, it is only necessary that each sensor unit is disposed at a different angle than any other sensor unit or units.

What is claimed is:

1. A system for the control of a movable member for following a moving object, comprising a following member, means for moving the following member, a sensing system for sensing the position of an object relative to a moving member and including at least two sensor units disposed on the following member in fixed relation to each other in a sensing space, each sensor unit comprising a transmitter for periodically transmitting ultrasonic waves and a receiver for the reception of reflections of the periodically transmitted ultrasonic waves as reflected by the moving object, said sensing system also including conversion means connected to the transmitter and the receiver for measuring the interval of time which elapses between the emission of an ultrasonic wave by the transmitter and the reception of the reflected wave from such emission and for converting each envelope of the reflected ultrasonic waves into control signals for steering the means for moving the following member, the means for moving being arranged so that the following member can follow a moving object under the control of the control signals of the conversion means.

2. A system as defined in claim 1 wherein the periodically transmitted waves are of a fixed frequency and of durations much greater than the period of the fixed frequency.

3. A system as defined in claim 1 wherein the fixed frequency is about 40 kHz and each envelope of a reflected ultrasonic wave rises and falls slowly to and from a well defined maximum value.

4. A system as defined in claim 3 wherein the conversion means includes peak detector means for detecting the moment of each each peak if maximum value of an envelope of a reflected ultrasonic wave.

5. A system as defined in claim 4 wherein the conversion means includes filter means for producing the envelope of a reflected ultrasonic wave.

6. A system for the control of a movable member for following a moving object, comprising a following member defining an axis and into which a moving object is to be penetrated when the object is at a predetermined penetrating position along said axis, means for moving the following member to position said axis relative to the moving object so that the latter is in its predetermined penetrating position, sensing means for sensing the position of the object relative to the following member and including two sensor units disposed substantially orthogonal with respect to each other on the following member in spaced relation to the axis, each sensor unit comprising transmitter means for periodically transmitting lobes of ultrasonic energy perpendicularly toward said axis and receiver means for receiving ultrasonic energy which is reflected from the object by each such lobe, means for alternately actuating said transmitter means so that the lobes transmitted by each transmitter means are alternate with respect to each other, the transmitter means and the receiver means having electrical characteristics to transmit ultrasonic energy at a particular frequency and mechanical properties causing the reflected ultrasonic energy to have an amplitude which increases and decreases slowly to to provide a welldefined maximum amplitude, envelope detector means connected to the receiver means for detecting an envelope of the reflected energy, and means for detecting the moment of maximum amplitude of the reflected energy relative to the moment of transmission of the ultrasonic energy which caused each such reflection.

7. The system as defined in claim 6 including means for moving the member vertically to enclose the object when the object is located at its predetermined penetrating position.

8. The system as defined in claim 6 wherein the envelope detector means includes narrow band-pass filter means for passing bursts of ultrasonic energy of only about 40 kHz.

9. The system as defined in claim 8 wherein the envelope detector means also includes rectifier means and low-pass filter means for producing an envelope of each reflected wave.

10. The system as defined in claim 9 wherein the means for detecting the moment of maximum amplitude includes counter means triggered by the transmitter means to start a count and triggered by the receiver means to stop a count.

11. The system as defined in claim 6 wherein each sensor unit includes a wave guide axially directed toward said axis and having a bevelled end.

12. A system for controlling the position of a movable member relative to a moving object, which comprises the combination of a movable member defining a movable vertical axis, a pair of transmitting transducer means on the movable member spaced from said axis for alternately transmitting lobes of ultrasonic energy having a frequency of about 40 kHz toward said axis substantially in a horizontal region of interest centered on said axis, a pair of receiving transducer means generally side-by-side with respect to the transmitting transducer means on the movable member spaced from said axis for alternately receiving ultrasonic energy from such region which is reflected from the moving object, each of the lobes having a duration much greater than the period of the 40 kHz frequency, the transmiting transducer means and the receiving transducer means each being housed in a wave guide directed toward said axis causing the reflected ultrasonic energy to have an amplitude which increases and decreases slowly to provide a welldefined maximum amplitude when the moving object penetrates said region, means for detecting an envelope of the reflected energy, means for detecting the moment of maximum amplitude of the reflected envelope relative to the moment of transmission of the ultrasonic energy, and means for moving the movable member to locate the moving object at a predetermined location in said region along said axis.

13. The system as defined in claim 12 wherein the means for detecting includes narrow band-pass filter means for passing bursts of ultrasonic energy of only about 40 kHz.

14. The system as defined in claim 13 wherein the means for detecting includes rectifier means and low-pass filter means for producing the envelope of a reflected wave.

15. The system as defined in claim 14 wherein the means for detecting the moment of maximum amplitude includes counter means triggered by the transmitter means to start a count and triggered by the receiver means to stop a count.

* * * * *